United States Patent [19]

Chahabadi et al.

[11] Patent Number: 5,592,557
[45] Date of Patent: Jan. 7, 1997

[54] RADIO RECEIVER WITH DIGITAL SIGNAL PROCESSING

[75] Inventors: Djahanyar Chahabadi; Matthias Herrmann; Lothar Vogt, all of Hildesheim; Juergen Kaesser, Diekholzen, all of Germany

[73] Assignee: Blaupunkt-Werke GmbH, Hildesheim, Germany

[21] Appl. No.: 343,414

[22] PCT Filed: Mar. 22, 1994

[86] PCT No.: PCT/DE94/00326

§ 371 Date: Feb. 16, 1995

§ 102(e) Date: Feb. 16, 1995

[87] PCT Pub. No.: WO94/22232

PCT Pub. Date: Sep. 29, 1994

[30] Foreign Application Priority Data

Mar. 24, 1993 [DE] Germany .......................... 43 09 518.6

[51] Int. Cl.$^6$ ................................................ H04H 5/00
[52] U.S. Cl. .................... 381/10; 381/7; 381/13
[58] Field of Search .................... 381/7, 10, 11, 381/13, 2, 3, 4; 375/316; 364/724.1

[56] References Cited

U.S. PATENT DOCUMENTS 4,379,207  4/1983  Kubota ........................ 381/13
4,827,515  5/1989  Reich .......................... 381/7
5,357,544 10/1994  Horner et al. ................ 364/724.1

FOREIGN PATENT DOCUMENTS

0418036A2  3/1991  European Pat. Off. .
0449199A2 10/1991  European Pat. Off. .

OTHER PUBLICATIONS

Reich et al., "Digital FM–Stereo Demodulation and Decoding", *Signal Processing IV: Theories and Applications*, Bd. 2, 8, Sep. 1988, Grenoble, France, pp. 499–502, XP93955.

Bakhru, "Communications Receiver Design Using Digital Processing", *Digital Signal Processing*, Bd. 2, Nr. 1, Jan. 1992, Orlando, Florida, U.S., pp. 2–13, XP387796.

*Primary Examiner*—Jason Chan
*Assistant Examiner*—Vivian W. Chang
*Attorney, Agent, or Firm*—Kenyon & Kenyon

[57] ABSTRACT

In a radio receiver with digital signal processing, a stereo multiplex signal received and the useful signals derived therefrom are processed in digital form at a first sampling rate. The subsidiary signals derived from the stereo multiplex signal are at least partly processed at a second sampling rate that is smaller than the first sampling rate. The sampling rate of the processed subsidiary signals are reduced to the first sampling rate with the processed subsidiary signals, acting as control signals with the first sampling rate, affecting the stereo multiplex signal and the useful signals.

12 Claims, 3 Drawing Sheets

RADIO RECEIVER WITH DIGITAL SIGNAL PROCESSING

FIELD OF THE INVENTION

The present invention relates to radio receivers, in particular, to a radio receiver with digital signal processing.

BACKGROUND INFORMATION

Processors for digital signal processing are known that are programmable for specific tasks. Thus signal processing tasks such as addition or multiplication of the individual sampled values of the digital signals, but also considerably more complex tasks such as digital filtering, can be performed. In a radio receiver many different signals are present, which must be processed almost simultaneously in the case of a configuration with one or more digital signal processors. Thus a very high level of computing power is required of the signal processors.

SUMMARY OF THE INVENTION

An object of the present invention is to provide a radio receiver with digital signal processing wherein the capabilities of the circuits present, specifically of signal processors, are optimally utilized for digital signal processing.

This goal is achieved by the present invention by processing a received stereo multiplex signal and the useful signals derived therefrom in digital form with a first sampling rate, processing at least part of the subsidiary signals derived from the stereo multiplex signal with a second sampling rate that is lower than the first sampling rate, increasing the sampling rate of the processed subsidiary signals to the first sampling rate, and influencing the stereo multiplex signal and the useful signals through the processed subsidiary signals serving as control signals with the first sampling rate.

In the radio receiver of the present invention, the capability of a digital signal processor is made use of in an especially advantageous manner so that not only the basic functions of the radio receiver, i.e., receiving and demodulating audio signals, are performed, but also other functions are possible, for example, matching the signal processing to the quality of the signals received.

In increasing the sampling rate of the processed subsidiary signals, aliasing noise may occur. If this noise is noticeable in the reproduced audio signals, a further improvement of the present invention provides for low-pass filtering immediately after increasing the sampling rate of the processed subsidiary signals to the first sampling rate.

Noise can be detected in the received stereo multiplex signal in a further improvement of the present invention by deriving a first subsidiary signal, which contains spectral components of the stereo multiplex signal between the upper limit of the useful frequency range of the stereo multiplex signal and the first sampling rate, and reducing its sampling rate to the second sampling rate.

Another possibility for detecting noise is provided by another improvement by obtaining a symmetry signal in quadrature in relation to the (L-R) difference band during stereo encoding, which forms the second subsidiary signal via a low-pass filter and sampling rate reduction to the second sampling rate.

Furthermore, the incoming signal level is important for evaluating the quality of a signal and as information for a transmitter scan or test reception from alternative transmitters. In another improvement, the incoming signal level is measured by producing a third subsidiary signal from an amplitude-modulated FM intermediary frequency signal via low-pass filtering and sampling rate reduction.

An advantageous derivation of control signals in the radio receiver of the present invention is possible by producing, via a combination of the subsidiary signals, a first control signal affecting the stereo channel separation and a second control signal reducing the volume of the reproduced useful signals in the case of noise.

Another improvement of the present invention consists of having an integer ratio between the first and second sampling rates. The first sampling rate is preferably 228 kHz and the second sampling rate 9.5 kHz.

The use of a tuner which is at least partially digital is possible in an advantageous manner when the stereo multiplex signal can be supplied from a receiving means in digital form with a third sampling rate, which is higher than the first sampling rate and is preferably twice the first sampling rate.

In an advantageous embodiment of the radio receiver of the present invention, suitable signal processing via sampling rates is possible by processing the stereo multiplex signal, the useful signals, the subsidiary signals and the control signals in a digital signal processor with the help of a program, including subprograms for processing the stereo multiplex signal and the useful signals and n subprograms for processing the subsidiary and control signals, n being the ratio between the first and second sampling rates;

running the program repeatedly at a frequency corresponding to the first sampling rate, with the subprograms for processing the stereo multiplex signal and the useful signals, and another subprogram for processing the subsidiary and control signals being run in each cycle.

BRIEF DESCRIPTION OF THE DRAWINGS

Figure 1:
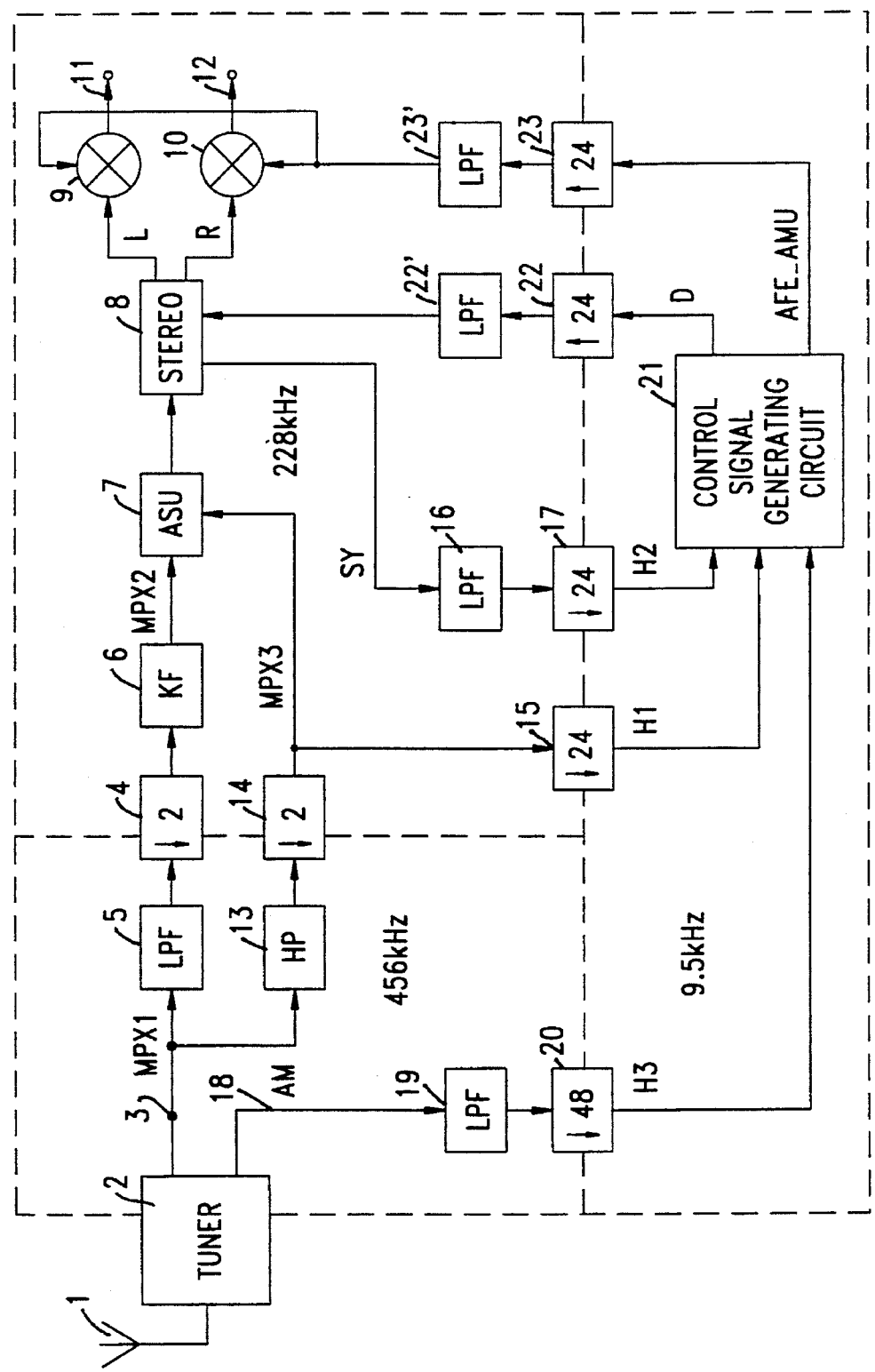
FIG. 1 is a block diagram of an embodiment of a radio receiver in accordance with the present invention.

In the embodiment of a radio receiver of the present invention represented in FIG. 1, the signal received via an antenna 1 is amplified, selected and demodulated in a well-known manner in a tuner 2. At an output 3 of tuner 2 there is available a stereo multiplex signal MPX1 with a sampling rate of 456 kHz. In order to achieve a subsequent sampling rate reduction (known as decimation) to 228 kHz without aliasing noise, a low-pass filter 5 is provided prior to sampling rate reduction 4. For proper further processing of the stereo multiplex signal, a low-pass filter with a uniform frequency response within the passband is needed. In order to save the associated cost, especially at the high sampling rate of 456 kHz, a simpler low-pass filter with decreasing frequency response of the filter 5 response is provided in the embodiment. The drop in frequency is, however, compensated in a subsequent compensation filter 6.

The stereo multiplex signal MPX2 is then subjected via circuit 7 to an automatic noise suppression, which repeats the sampling rates present prior to the beginning of the noise until the end of the noise, especially when radio interference appears. A stereo decoder 8 is connected to this circuit and produces two audio signals L, R, which go via multipliers 9, 10 to outputs 11, 12. The audio signals are then supplied to the speakers via LF amplifiers.

A signal containing signal components above the useful frequency range but aliased by decimation to a lower frequency range is obtained from the stereo multiplex signal MPX3, using a high-pass filter 13 and a decimating circuit 14. This MPX3 signal indicates different types of noise, for example, noise produced by ignition sparks of vehicles. It is used, on the one hand, for controlling automatic noise suppression circuit 7 and, on the other hand, for forming a subsidiary signal H1 via decimation of the sampling rate to 9.5 kHz at 15.

Another subsidiary signal, also with a sampling rate of 9.5 kHz, is formed from a symmetry signal SY via low-pass filtering at 16 and decimation at 17. This symmetry signal is re-formed in the stereo decoder 8. In the stereo decoder the stereo auxiliary carrier is amplitude modulated in the well-known manner for forming the L-R difference signal. This is done in the embodiment represented in FIG. 1 by multiplying the auxiliary carrier by an auxiliary carrier of the same phasing, regenerated in the radio receiver. In stereo decoder 8 the stereo auxiliary carrier is then multiplied by a carrier rotated 90° in relation to the reference carrier, whereby a signal is obtained, which for symmetrical sidebands of the stereo subsidiary carrier is zero and, in the case of asymmetry, deviates from zero accordingly. The other subsidiary signal H2 is formed from this signal via low-pass filtering at 16 and decimation at 17.

At an output 18, tuner 2 emits an AM signal, obtained via amplitude modulation of the FM intermediary signal. In the embodiment illustrated, this signal also has a sampling rate of 456 kHz and after low-pass filtering 19 is decimated at 20 by a factor of 48, so that the third subsidiary signal H3 obtained has a sampling rate of 9.5 kHz.

In a circuit 21, subsidiary signals H1, H2 and H3 are combined into control signals D and AFE__AMU, the sampling rate of which is initially equal to 9.5 kHz, but is increased to 228 kHz at 22 and 23. This is done by interpolating 24 sampling values for each, which in the simplest case consists of repeating each sampling value 24 times. Control signal D is supplied to a control input of stereo decoder 8 via low-pass filter 22' and is used there for switching to mono operation in the case of bad reception. Signal AFE__AMU is supplied to multipliers 9 and 10 via a low-pass filter 23', whereby the volume is reduced (masking) in the case of noise.

Figure 2:
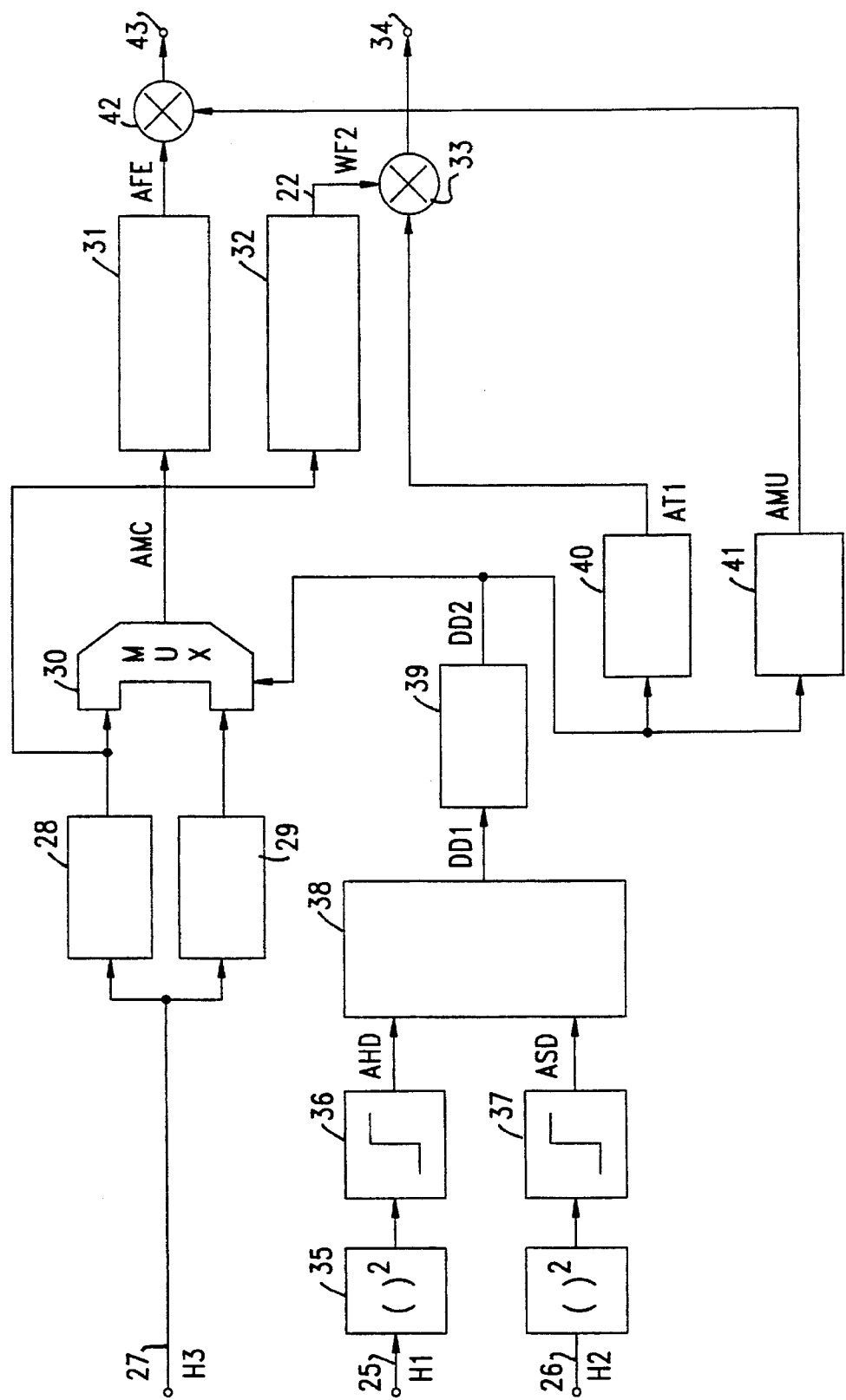
FIG. 2 is a block diagram of a control circuit in accordance with the present invention.

FIG. 2 shows an embodiment of circuit 21 (FIG. 1). Subsidiary signals H1, H2 and H3 are supplied to inputs 25, 26, 27. The subsidiary signal H3 designating the incoming signal level is halved in two low-pass filters 28 and 29 with different time constants. An alteration switch 30 forwards one of the output signals of low-pass filters 28, 29 as signal AMC, depending on a signal DD2, to be explained later. It is weighted at 32 in the form of a noise curve for producing noise attenuation AFE. The signal level with the smaller time constant is then also weighted at 31 (WF2 signal). This is multiplied at 33 by a signal AT1 to form control signal D, which is available at output 34.

In order to obtain signal DD2, subsidiary signals H2 and H3 are used. Subsidiary signal H1, representing the spectral components above the useful range of the stereo multiplex signal, is first squared at 35, whereby a measure of the energy content of these components is obtained. This is passed through a threshold value detector 36 so that a signal AHD is obtained which indicates the presence of spectral components with an energy exceeding a certain predetermined value. Subsidiary signal H2 formed from symmetry signal SY (FIG. 1) is forwarded, after squaring at 37, via a threshold value detector 37' with an output signal ASD which shows asymmetries exceeding a predefined value. Such asymmetries indicate, among other things, the presence of adjacent channel interference.

In many applications, the use of one of the signals AHD or ASD as the DD2 signal offers significant advantages. In the embodiment illustrated, however, two detectors 36 and 37' are provided, with output signals AHD and ASD which are supplied to a controllable logic network 38. This has, on the one hand, the advantage that in pure mono transmissions, in which no carrier-frequency stereo signal is transmitted, signal DD2 is derived from subsidiary signal H1. Signal DD2 can also be derived in the case of stereo transmission processes different from the European standard, e.g., the FMX process in the USA.

The logic network 38 allows selection or logical composition of the two signals AHD and ASD into a signal DD1. Logic network 38 can be formed in a simple manner from a controllable four-way alteration switch, to the inputs of which signals AHD and ASD, an OR composition of these signals, and an AND composition of these signals can be supplied. Signal DD1 is then available at the output of the controllable alteration switch and is supplied to a pulse width discriminator 39. This causes signal DD2 to indicate noise only when signal DD1 is active during an adjustable minimum time.

Signal DD2 is used, in addition to controlling alteration switch 30, as a trigger signal for two asymmetric integrators 40 and 41. Each of the asymmetric integrators 40 and 41 these basically contains a counter that jumps to zero or another predefined value at the time of triggering and maintains this value as long as signal DD2 is at zero. If signal DD2 goes to logical level 1, output signals AT1 and AMU of asymmetric integrators 40 and 41 with adjustable time constants increase linearly to a maximum value. Signal AT1, together with level signal WF2, weighted at 31, is supplied to multiplier 33.

Output signal AMU of asymmetric integrator 41 is multiplied by signal AFE at 42, whereby the signal AFE__AMU is obtained which causes the audio signal to be attenuated by a maximum of 33 dB with the help of multipliers 9 and 10 (FIG. 1). This signal can be captured from the circuit at output 43.

Figure 3:
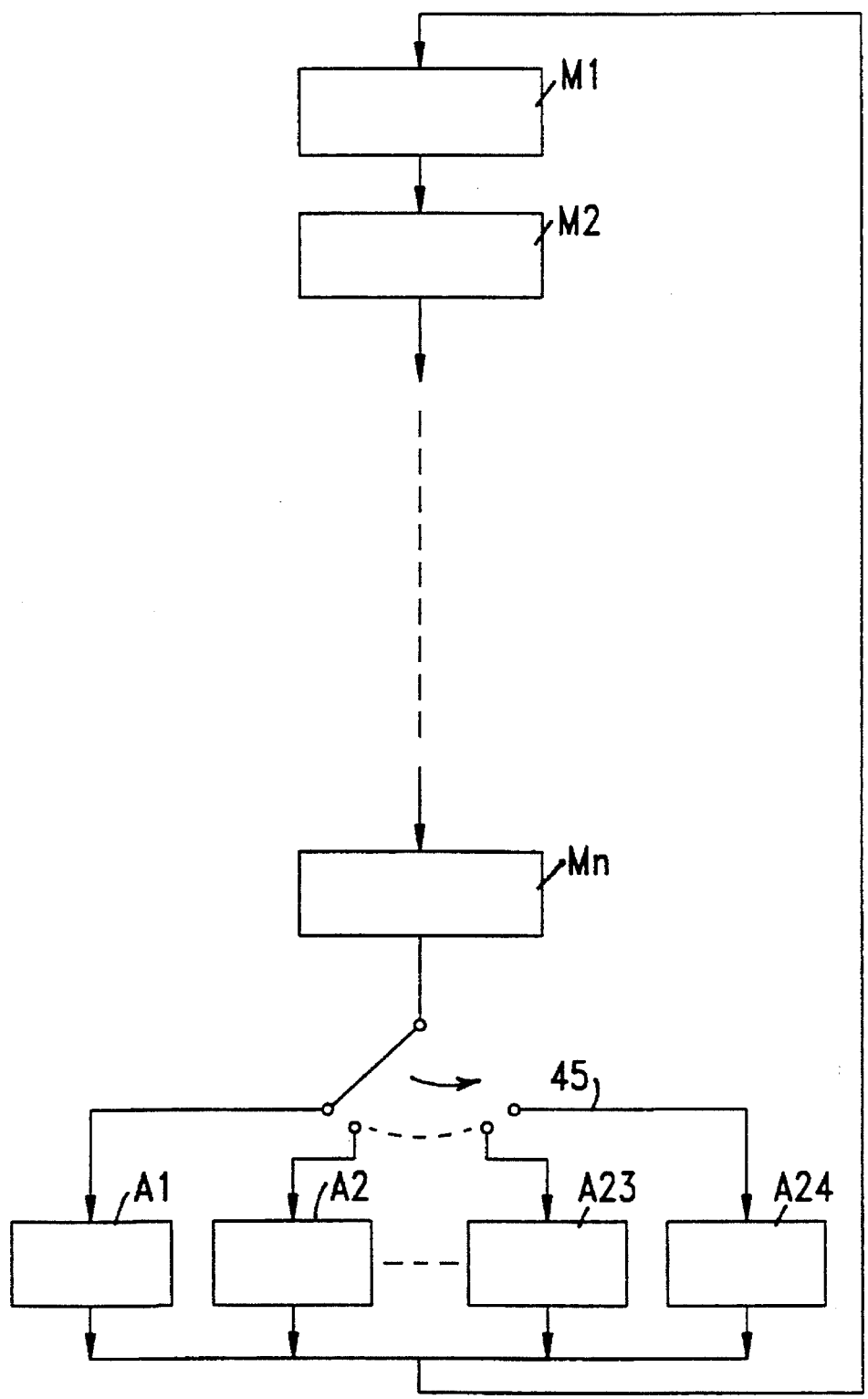
FIG. 3 is a flow-chart of a program for a digital signal processor in a radio receiver of the present invention.

The program represented in FIG. 3 in a very simplified form for performing the functions explained with the block diagram of FIG. 1 consists of a loop repeated with a frequency of 228 kHz. In each cycle, subprograms M1 through Mn for processing the signals with a sampling frequency of 228 kHz are run consecutively. These subprograms are performed specifically by compensation filter 6, automatic noise suppression circuit 7, stereo decoder 8, multipliers 9 and 10, as well as low-pass filter 15.

In each cycle, another subprogram from among A1 through A24 is run after subprogram Mn. A subprogram that calls up one of subprograms A1 through A24 after subprogram Mn depending on a numerical variable is represented schematically as alteration switch 45. Subprograms A1 through A24 are run only after every 24th run, which corresponds to a sampling rate of 9.5 kHz. In these subprograms, the functions represented in FIG. 2 in block diagram form are specifically performed.

Decimations 15 and 17 are performed by writing the sampling values of signal MPX3 or the low-pass filtered symmetry signal SY in one of subprograms M1 through Mn, and by subprograms A1 through A24, which process signals H1 and H2, reading the stored sampling values at the lower sampling rate. Sampling rate conversion 22 and 23 (FIG. 1) is accomplished by one of the subprograms A1 through A24 writing a sampling value of a signal into a memory and by subprograms M1 through Mn, which require this signal, reading this sampling value 24 times at the higher sampling rate. In order to avoid aliasing noise, each sampling rate conversion at 22 and 23 (FIG. 1) is followed by low-pass filtering.

In the embodiment represented, processing is done at the 456 kHz level by another signal processor, which basically performs functions within tuner 2, specifically demodulation of the IF signal. Decimation 20 is then performed by this signal processor writing the sampling values of the AM signal after low-pass filtering at 19 (FIG. 1) with a frequency of 456 kHz into a memory, from which the signal processor reads sampling values with a sampling rate of 9.5 kHz (i.e., every 24th sampling value) in one of subprograms A1 through A24.

What is claimed is:

1. A radio receiver with digital signal processing, comprising:

a tuner for receiving a stereo multiplex signal;

first processing means for processing the received stereo multiplex signal and signals derived therefrom in digital form at a first sampling rate;

sampling rate decreasing means for decreasing the sampling rate of the processed signals derived from the received stereo multiplex signal to a second sampling rate, thereby generating subsidiary signals;

second processing means for processing at least part of the subsidiary signals at the second sampling rate;

sampling rate increasing means for increasing the sampling rate of the processed subsidiary signals to the first sampling rate; and control means for controlling the stereo multiplex signal and the signals derived therefrom with the processed subsidiary signals at the first sampling rate.

2. The radio receiver according to claim 1, further comprising at least one low-pass filter disposed immediately following the sampling rate increasing means.

3. The radio receiver according to claim 1, wherein:

a first of the signals derived from the stereo multiplex signal contains signal components above a useful frequency range of the stereo multiplex signal; and the sampling rate decreasing means decreases the sampling rate of the first of the signals derived from the stereo multiplex signal, thereby generating a first of the subsidiary signals.

4. The radio receiver according to claim 1, wherein:

the first processing means includes a stereo decoder which generates a symmetry signal which is in quadrature relation to an L-R difference band, and a low-pass filter for low-pass filtering the symmetry signal; and the sampling rate decreasing means decreases the sampling rate of the filtered symmetry signal to the second sampling rate, thereby generating a second of the subsidiary signals.

5. The radio receiver according to claim 1, wherein the tuner generates an amplitude-modulated FM intermediary frequency signal, and the radio receiver further comprises:

a low-pass filter for low-pass filtering the amplitude-modulated FM intermediary frequency signal; and further sampling rate decreasing means for decreasing the sampling rate of the filtered amplitude-modulated FM intermediary frequency signal to the second sampling rate, thereby generating a third subsidiary signal.

6. The radio receiver according to claim 1, wherein the second processing means includes:

means for combining the subsidiary signals to generate a first control signal for controlling the stereo channel separation, and a second control signal for reducing a volume, in the presence of noise, of at least part of the signals derived from the received stereo multiplex signal.

7. The radio receiver according to claim 1, wherein a ratio of the first sampling rate to the second sampling rate is an integer.

8. The radio receiver according to claim 7, wherein the first sampling rate is 228 kHz and the second sampling rate is 9.5 kHz.

9. The radio receiver according to claim 1, wherein the tuner provides the stereo multiplex signal in digital form at a third sampling rate which is higher than the first sampling rate.

10. The radio receiver according to claim 9, wherein the third sampling rate is twice the first sampling rate.

11. The radio receiver of claim 1, wherein:

the first processing means, the second processing means, and the control means are implemented in at least one digital signal processor executing a program comprising at least one first subprogram for processing the stereo multiplex signal and the signals derived from the stereo multiplex signal and n second subprograms for processing the subsidiary signals, with n being the ratio between the first and second sampling rates; and the program is repeatedly run at a frequency corresponding to the first sampling rate, with the at least one first subprogram and a selected one of the second subprograms running in each cycle.

12. A method of receiving a radio transmission with digital signal processing, the method comprising the steps of:

receiving a stereo multiplex signal;

processing the received stereo multiplex signal and signals derived therefrom in digital form at a first sampling rate;

decreasing the sampling rate of the processed signals derived from the received stereo multiplex signal to a second sampling rate, thereby generating subsidiary signals;

processing at least part of the subsidiary signals at the second sampling rate;

increasing the sampling rate of the processed subsidiary signals to the first sampling rate; and controlling the stereo multiplex signal and the signals derived therefrom with the processed subsidiary signals at the first sampling rate.

* * * * *

UNITED STATES PATENT AND TRADEMARK OFFICE
CERTIFICATE OF CORRECTION

PATENT No. : 5,592,557

DATED : January 7, 1997

INVENTOR(S): Djahanyar Chahabadi, Matthias Herrmann, Lothar Vogt and Juergen Kaesser It is certified that error appears in the above-identified patent and that said Letters Patent is hereby corrected as shown below:

Column 2, line 50, "BRIEF DESCRIPTION OF THE DRAWINGS" should be --DETAILED DESCRIPTION--;

Signed and Sealed this

Thirty-first Day of August, 1999

*Attest:*

Q. TODD DICKINSON

*Attesting Officer*  Acting Commissioner of Patents and Trademarks